US005929359A

United States Patent [19]

Sone et al.

[11] Patent Number: 5,929,359

[45] Date of Patent: Jul. 27, 1999

[54] KARAOKE APPARATUS WITH CONCURRENT START OF AUDIO AND VIDEO UPON REQUEST

[75] Inventors: Takuro Sone; Yukio Tada; Youji Semba, all of Hamamatsu, Japan

[73] Assignee: Yamaha Corporation, Hamamatsu, Japan

[21] Appl. No.: 09/048,144

[22] Filed: Mar. 25, 1998

[30] Foreign Application Priority Data

Mar. 28, 1997 [JP] Japan .................................... 9-077079

[51] Int. Cl.[6] .............................. G09B 5/00; G09B 15/04

[52] U.S. Cl. ...................... 84/610; 84/477 R; 84/DIG. 6; 434/307 A

[58] Field of Search .............................. 84/602, 609–614, 84/634–638, 477 R, 478, DIG. 6; 434/307 A

[56] References Cited

U.S. PATENT DOCUMENTS 5,247,126 9/1993 Okamura et al. ......................... 84/609

5,533,903 7/1996 Kennedy ............................... 84/610 X

*Primary Examiner*—Stanley J. Witkowski

*Attorney, Agent, or Firm*—Pillsbury Madison & Sutro LLP

[57] ABSTRACT

In a karaoke apparatus, an audio device is responsive to a request of a music piece for starting karaoke performance of the music piece to accompany a live singing voice of the music piece. A monitor device displays a background image selected from a temporary picture having a short term and a permanent picture having a long term in matching with the music piece to support the karaoke performance. A first video device is enabled initially without a substantial delay time when the audio device starts the karaoke performance for providing the temporary picture corresponding to the requested music piece. A second video device is enabled subsequently to the first video device with a substantial delay time after the audio device starts the karaoke performance for providing the permanent picture corresponding to the requested music piece. A control device operates when the karaoke performance is started upon the request for initially feeding the temporary picture provided from the first video device to the monitor device until the second video device is enabled, and operates when the second video device is enabled for subsequently feeding the permanent picture provided from the second video device to the monitor device in place of the temporary picture so that the background image displayed on the monitor device is switched from the temporary picture to the permanent picture.

17 Claims, 5 Drawing Sheets

| SONG NUMBER | STILL PICTURE NUMBER |
|---|---|
| 1234-01 | 01 |
| 5678-02 | 05 |
| 3210-11 | 03 |
| ⋮ | ⋮ |

KARAOKE APPARATUS WITH CONCURRENT START OF AUDIO AND VIDEO UPON REQUEST

BACKGROUND OF THE INVENTION

1. Field of the Invention

The present invention generally relates to a karaoke apparatus for displaying a background image on a monitor in synchronization with music performance of a karaoke song.

2. Description of Related Art

Communication karaoke apparatuses have been widely spread recently. The communication karaoke apparatus stores song data for performing karaoke songs separately from background image data to be displayed on the monitor as the background image together with lyric words of the karaoke song. A background image suitable for a requested karaoke song is selected for reproduction. The conventional karaoke apparatuses normally display moving pictures as background image. These karaoke apparatuses mostly use a Laser Disc (trademark) as a storage medium for storing video data of moving pictures. Recently, however, a karaoke apparatus has been proposed in which a background image reproducing device handles a plurality of video CDs provided as video storage media mainly for the purpose of making the karaoke apparatus compact in size. As a storage medium, the video CD is made compact by recording moving pictures in a compressed form based on MPEG (Moving picture Experts Group) standard.

However, the above-mentioned video CD reproducing device or video CD changer requires to set one video CD on a turn table, to access a specified chapter on the video CD, to read data from the specified chapter, and to expand the MPEG-compressed data. These operations take as long as about 40 seconds from the time at which an instruction for video reproduction is made to the time at which the reproduction actually starts. Therefore, in order to concurrently start the audio performance of a karaoke song and the video reproduction of a background image in synchronization with each other, about 40 seconds of standby or preparatory time is spent or consumed between a request or command to start karaoke performance operation and an actual start of the specified karaoke song. This delay presents a drawback of dampening or discouraging the enthusiasm of karaoke singers to sing.

Another type of the karaoke apparatus utilizes a video mixer which selects one of TV picture, LD (Laser Disc) picture and video camera picture, and which superimposes lyric words of a karaoke song reproduced from CD graphics with the selected background picture. However, in such a karaoke apparatus, the displayed background picture is not associated with the karaoke song at all, thereby discouraging the enthusiasm of karaoke players.

Further, for various types of the karaoke apparatus, the reference is made to prior U.S. patent application Ser. Nos. 08/522,714 and 08/537,134, which are owned by the assignee of the present application.

SUMMARY OF THE INVENTION

It is therefore an object of the present invention to provide a karaoke apparatus capable of starting audio performance of a karaoke song along with video display without waiting for a video CD reproducing device to start reproducing of a background image.

The inventive karaoke apparatus comprises performing means responsive to a request of a karaoke song for carrying out performance of the karaoke song to accompany a live singing voice, monitor means for displaying a background image selected from a temporary picture and a moving picture to support the performance of the karaoke song, storage means for storing the moving picture which is provisionally compressed for storage, reproducing means operable after preparation for starting expansion of the compressed moving picture stored in the storage means to reproduce the moving picture, providing means operable instantly for providing the temporary picture, and switching means operative when the performance of the karaoke song starts upon the request for accessing the providing means to feed the temporary picture to the monitor means until the reproducing means completes the preparation for reproduction of the moving picture, and being operative when the reproducing means starts the reproduction for switching the background image displayed on the monitor means from the temporary picture to the moving picture.

Further, the inventive karaoke apparatus comprises performing means responsive to a request of a karaoke song for carrying out performance of the karaoke song to accompany a live singing voice, monitor means for displaying a background image selected from a temporary picture and a moving picture to support the performance of the karaoke song, storage means for storing a plurality of moving pictures, reproducing means operable after search of the storage means for starting reproduction of a moving picture searched from the storage means and corresponding to the requested karaoke song, providing means operable instantly for providing a temporary picture, and switching means operative when the performance of the karaoke song starts upon the request for accessing the providing means to feed the temporary picture to the monitor means until the reproducing means completes the search of the storage means for the moving picture, and being operative when the reproducing means starts the reproduction of the moving picture for switching the background image displayed on the monitor means from the temporary picture to the moving picture.

The karaoke apparatus according to the present invention is designed for displaying the moving picture of the background image on the monitor means in parallel to the performance of the requested karaoke song. The moving picture is stored in the storage means in a compressed form. Therefore, it takes a certain time to expand the compressed video data into a reproducible form. The karaoke apparatus according to the invention may treat a plurality of moving picture storage media. Therefore, it takes a certain time to select a storage medium in which the desired moving picture of the background image is stored, and to search the selected storage medium for the desired moving picture. In the present invention, these waiting or idling intervals are filled with a temporary picture that can be instantly displayed on the monitor means, thereby allowing karaoke players to sing karaoke songs without an awkward wait time and preventing a blank period from occurring. The temporary picture can be instantly displayed on the monitor means and is supplied from the temporary picture providing means in the form of a still picture stored in an internal storage device such as a hard disk drive, in the form of a live picture of a karaoke player picked up by a video camera, or in the form of a television picture that is distributed independently of and asynchronously with the karaoke performance. It should be noted that this distributed television picture can be supplied through cable TV or communication satellite (CS).

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings. A karaoke apparatus according to the present invention separately stores song data for performing a karaoke song and video data for displaying a background image on a monitor in synchronization with the karaoke performance. When presenting a karaoke performance, a music tone is formed by supplying the song data for playing a specified song to performing means comprised of a tone generator. At the same time, the video data matching the genre of the specified song is reproduced to display a background image on the monitor. The video data is recorded in storage means composed of a plurality of video CDs, which are reproduced by reproducing means comprised of a video CD changer connected to this karaoke apparatus as an external device. The video CD changer selects a video CD in which the specified video is stored, and sets the selected video CD. To expand the MPEG-compressed video data, about 40 seconds of standby time is required from instructing of reproduction to starting of the reproduction. In the present karaoke apparatus, in starting a karaoke performance, a karaoke song is started without waiting for the video CD to be ready for reproduction and, until the moving picture recorded on the video CD is reproduced, a still picture stored in a hard disk drive is provided to the monitor by providing means including the hard disk drive.

Figure 1:
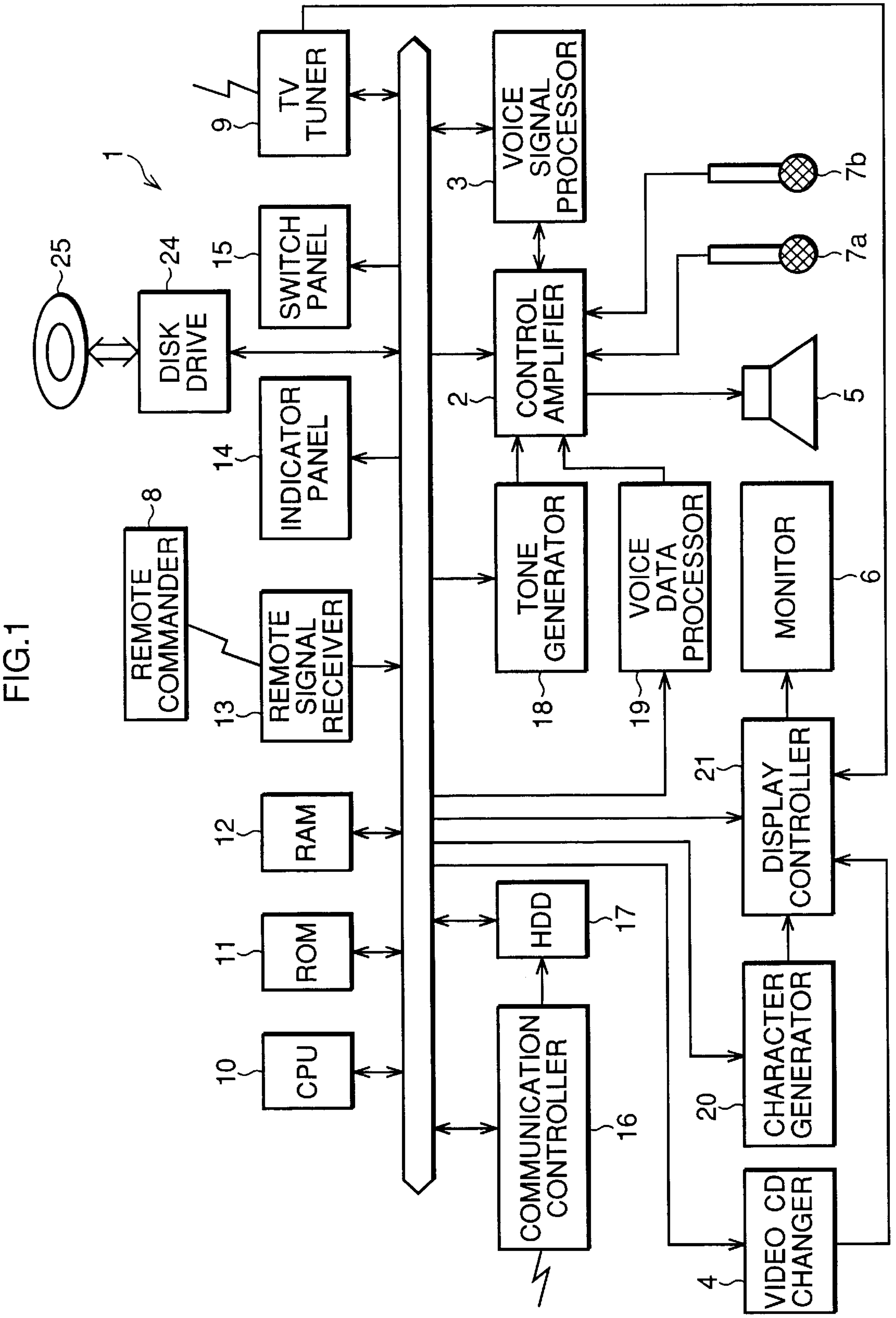
FIG. 1 is a block diagram illustrating a karaoke apparatus practiced as one preferred embodiment of the invention.

FIG. 1 is a block diagram illustrating the karaoke apparatus practiced as one preferred embodiment of the present invention. This karaoke apparatus is composed of a karaoke main frame 1, a control amplifier 2, a voice signal processor 3, a video CD changer 4, a loudspeaker 5, a monitor 6, microphones 7*a* and 7*b*, an infrared remote commander 8, and a TV tuner 9. The karaoke main frame 1 controls the operation of this karaoke apparatus in its entirety. A CPU 10 incorporated in the karaoke main frame 1 is connected to a ROM 11, a RAM 12, a hard disk drive (HDD) 17, a communication controller 16, a remote signal receiver 13, an indicator panel 14, a switch panel 15, a tone generator 18, a voice data processor 19, a character generator 20, a display controller 21, and an additional disk drive 24 through an internal bus. The CPU 10 is also connected through interface to the control amplifier 2, the voice signal processor 3, the video CD changer 4, and the TV tuner 9, those of which are external devices.

The ROM 11 stores a starting program and so on necessary for starting this karaoke apparatus. A system program and application programs for controlling this karaoke apparatus are stored in the hard disk drive 17. The application programs include a karaoke performance program and so on. When the karaoke apparatus is powered on, the system program and the karaoke performance program are loaded into the RAM 12 by the starting program. Occasionally, a machine readable medium 25 such as a floppy disk is loaded into the disk drive 24 for providing various programs executable by the CPU 10.

Figure 2:
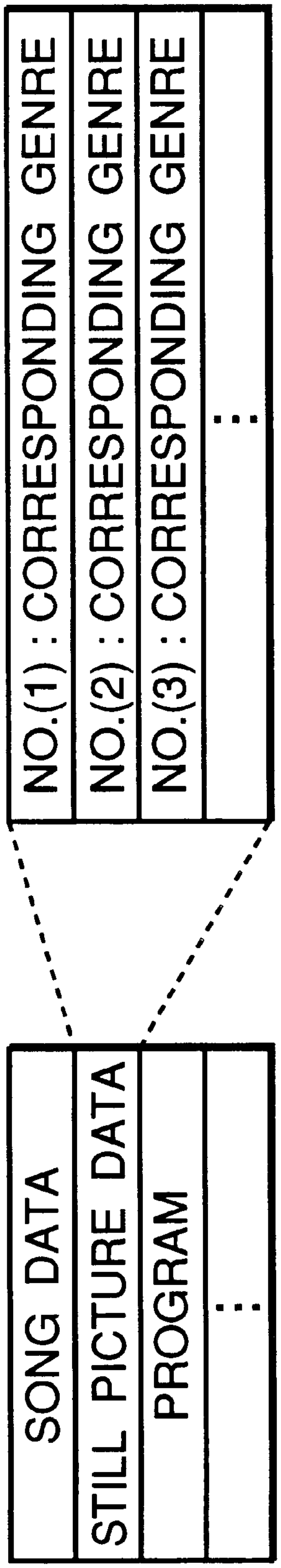
FIG. 2 is a diagram illustrating a data storage format on a hard disk drive used in the preferred embodiment of FIG. 1.

The hard disk drive 17 has a song data storage area, a still picture data storage area, and a program storage area as shown in FIG. 2. The song data storage area stores about 10,000 songs or music pieces. The still picture data storage area stores plural types of still picture data corresponding to various genres of karaoke songs. The still picture data is provided for displaying a temporary picture until the video CD changer gets ready for reproduction. This data is provided in a JPEG format for example. Therefore, when this data is read from the hard disk drive 17, image expansion can be made almost instantly. The program storage area stores the above-mentioned system program and application programs.

The communication controller 16 shown in FIG. 1 downloads song data and so on from a karaoke song distribution center through ISDN (Integrated Services Digital Network) line, and stores the downloaded song data into the hard disk drive 17. This storage operation is performed directly on the hard disk drive 17 by use of a DMA (Direct Memory Access) circuit. The remote commander 8 has key switches including numeric keys. When a user operates any of these switches, a code signal corresponding to the operated switch is outputted in the form of infrared radiation. The remote signal receiver 13 receives the infrared signal coming from the remote commander 8, restores the code signal, and inputs the restored signal into the CPU 10. When a song number is inputted from the remote commander 8, the CPU 10 registers this song number into a reservation list set in the RAM 12. The indicator panel 14 is arranged on the front face of the karaoke main frame 1, and has a matrix indicator for displaying a song number currently in performance and the number of reserved songs, and LEDs for displaying currently set music key and music tempo. The switch panel 15 has numeric keys for inputting a song number, a music key change switch, and a tempo change switch likewise the remote commander 8.

The tone generator 18 forms a music tone signal based on the data recorded on a music tone track included in song data. The music tone track has a plurality of sub tracks. The tone generator 18 simultaneously forms music tone signals of a plurality of parts based on the data recorded on these sub tracks. Data for setting up the tone generator 18 according to the selected song is written at the top of the song data. A set-up operation based on this data takes about 10 seconds. The voice data processor 19 forms a voice signal having a specified duration and a pitch based on voice data included in the song data. The voice data is data obtained by pulse-code-modulating (PCM) a waveform of a human voice such as a background vocal that can be hardly synthesized electronically. The music tone signal formed by the tone generator 18 and the voice signal formed by the voice data processor 19 are inputted in the control amplifier 2. The control amplifier 2 is connected to the two microphones 7*a* and 7*b* through which a singing voice signal of a karaoke singer is inputted. The control amplifier 2 imparts a predetermined effect such as echo to the inputted signals, amplifies the effect-added signals, and outputs the amplified signals to the loudspeaker 5. The voice signal processor 3 digitally processes the live singing voice signal inputted from the control amplifier 2 to correct an interval offset and to create a harmony singing voice of another part. The corrected live singing voice signal of one part and the created harmony singing voice signal of another part are inputted in the control amplifier 2.

The TV tuner 9 receives a television signal supplied from a cable television station or a communication satellite CS, and demodulates a video signal included in the received signal. The cable television station and the communication satellite CS have many channels corresponding to various genres of karaoke songs. Each channel is steadily broadcasting a moving picture video regardless of song performance. The TV tuner 9 selects a channel indicated by the CPU 10 among the above-mentioned plurality of channels, and inputs a video signal of the selected channel into the display controller 21. This video signal is used as a temporary moving picture to be displayed until the video CD changer 4 reproduces a moving picture of a background image matching a requested karaoke song. Optionally, a video camera may be connected to the TV tuner 9. The video camera is utilized to pick up a live picture of a karaoke player and a stage, which may be selected by the TV tuner 9 as the temporary picture.

The character generator 20 generates a character pattern of lyric words of the requested karaoke song based on inputted character data. The video CD changer 4, which is an external device, selects moving picture video data based on video select data supplied from the CPU 10 and reproduces the selected moving picture video data as a background image. The video select data is determined based on the genre data for example written in the header of the song data. The display controller 21 superimposes the character pattern of the lyric words inputted from the character generator 20 onto the background image, and displays a resultant image onto the monitor 6. For the background image, a permanent moving picture inputted from the video CD changer is used in general. However, a temporary television picture inputted from the tuner 9 or a still picture read from the hard disk drive 17 is used as a temporary background image until the video CD changer 4 selects a video CD, searches the selected video CD for necessary video data, and expands the MPEG-compressed video CD data. This background image switching is executed as instructed by switching means composed of the CPU 10.

Figure 3A:
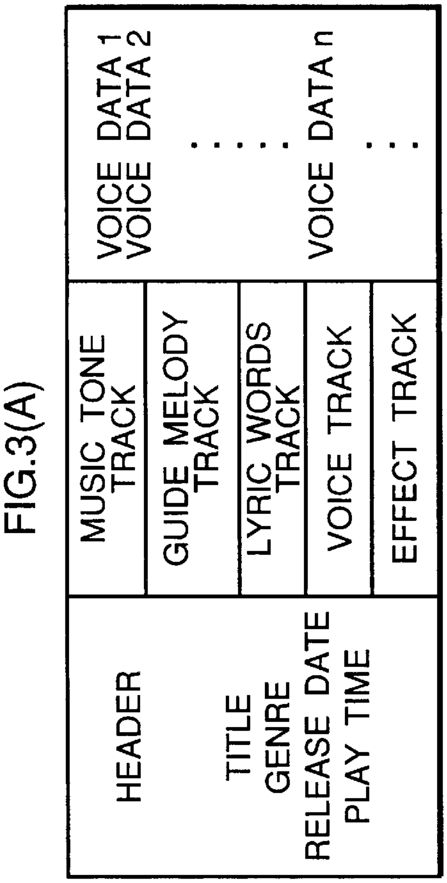
FIG. 3(A) and FIG. 3(B) are diagrams illustrating a song data format for use in the preferred embodiment of FIG. 1.
Figure 3B:
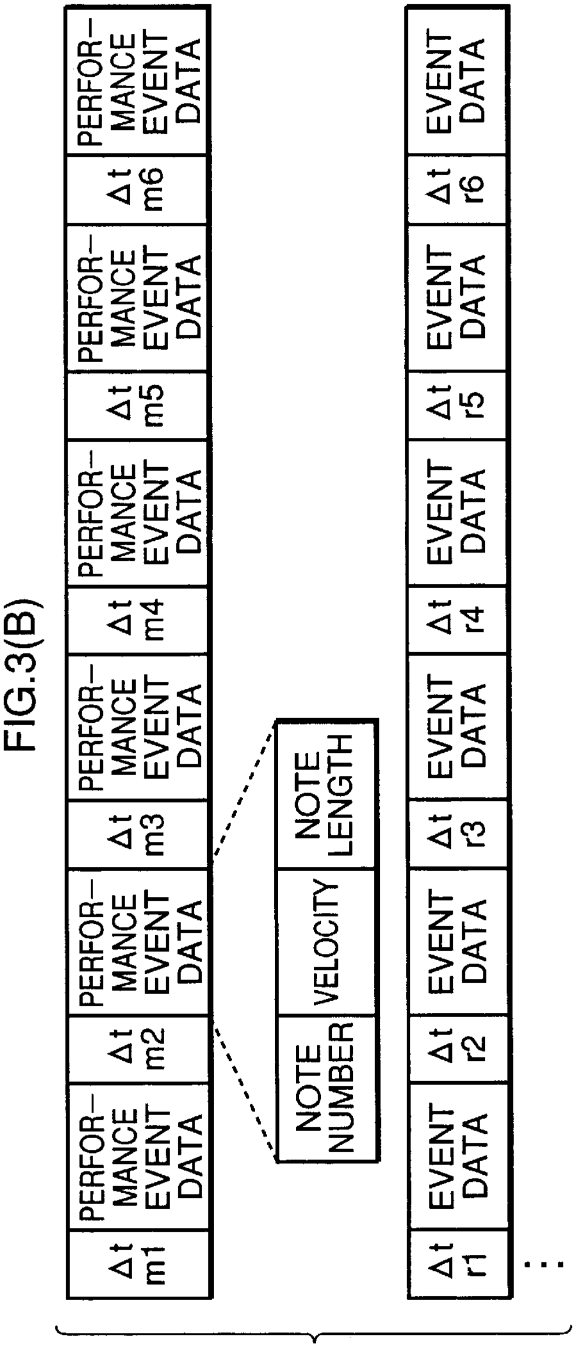

FIGS. 3(A) and 3(B) are diagrams illustrating a format of song data for use in the present karaoke apparatus. The song data is composed of a header, a music tone track, a guide melody track, a lyric words track, a voice track, an effect track, and a voice data section. The header records data associated with attributes of one song, namely, title, genre, release date, performance time, and so on of the song. The music tone track through the effect track are written in a MIDI format composed of performance data indicative of plural pieces of events and duration data indicative of a temporal interval between these events. The lyric words track through the effect track recorded with non-music data are also written in the MIDI format to provide integration in implementation and to facilitate work processes.

The music tone track is composed of sub tracks corresponding to a plurality of parts for forming a plurality of music tone signals by driving the tone generator 18. The guide melody track records data of a main melody of the karaoke song, namely data of a melody to be sung by a karaoke singer. The lyric words track records sequence data for displaying the lyric words of a karaoke song on the monitor 6. Event data recorded on the lyric words track is composed of a character code for the lyric words, and data for indicating a display position of the lyric words. The voice track specifies a sound timing of a voice data group recorded in the voice data section. The voice data section records PCM data sampled from human voice for example. Event data of the voice track specifies which voice data is to be reproduced in that event timing. The effect track records effect control data for controlling the control amplifier 2. Based on this effect control data, the control amplifier 2 imparts a reverberation-type effect such as reverberation to the music tone signal.

Figures 4A, 5:
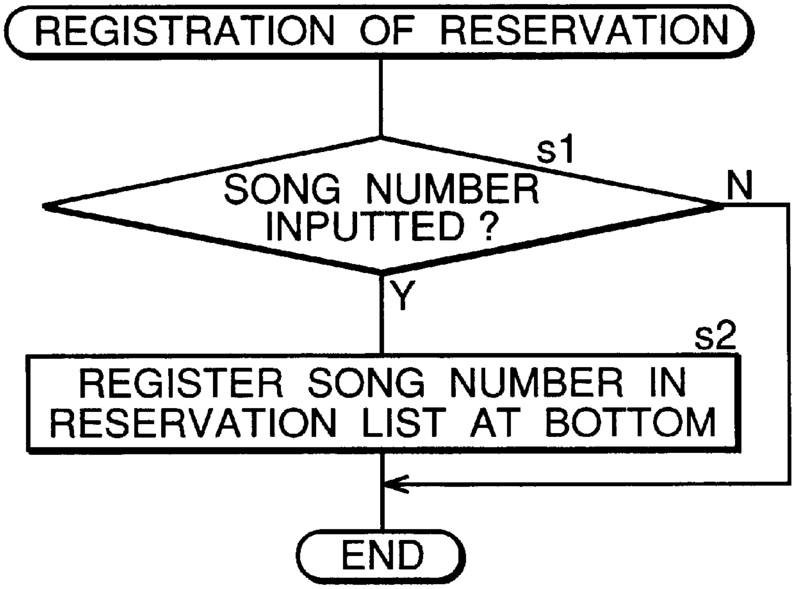
FIG. 4(A) and FIG. 4(B) are flowcharts indicative of operation of the preferred embodiment of FIG. 1.
FIG. 5 is a diagram illustrating a relationship between song numbers and still picture numbers.
Figure 4B:
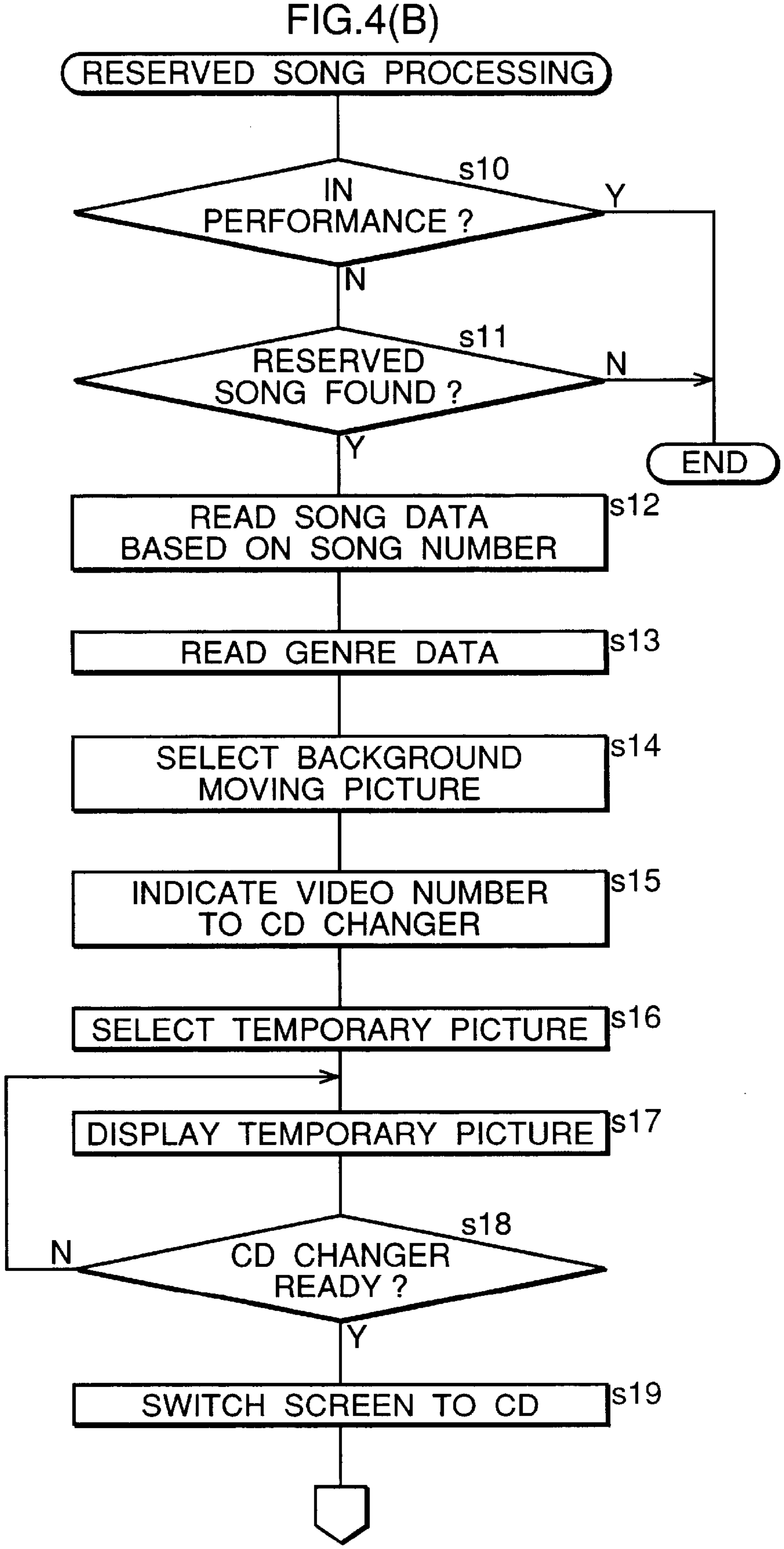

FIGS. 4(A) and 4(B) are flowcharts indicative of operation of the present karaoke apparatus. The flowchart shown in FIG. 4(A) indicates song reserving operation. First, it is determined whether a song number has been inputted from the remote commander 8 or the like (step s1). If no song number is inputted, the process returns without executing any further operation. If a song number is inputted, the same is registered into the reservation list at its last column (step s2) and the processing returns.

The flowchart shown in FIG. 4(B) indicates operation of processing the reserved song. First, it is determined whether a karaoke song is being performed (step s10). If a karaoke song is found in performance, the processing returns without executing any further operation because a next song cannot be started. If no karaoke song is being performed, namely if the performance of the last karaoke song has come to an end, it is determined whether another song is reserved, or a song number is registered in the reservation list (step s11). If no song is reserved, the processing returns without executing any further operation while leaving information such as advertisement for example.

If a reserved song is found, the song number registered at the top of the reservation list is read. The song data identified by this song number is read from the hard disk drive (step s12). Genre data recorded in the header of this song data is referenced (step s13) to select a background moving picture corresponding to this genre (step s14). The video CD changer 4 is instructed to reproduce this moving picture (step s15), while a temporary picture is provided to be displayed until the preparation for displaying the permanent moving picture is completed (step s16). This temporary picture is selected from the still pictures stored in the hard disk drive 17 or selected from the television pictures received by the tuner 9. As described above, the temporary pictures are also supplied in plurality corresponding to the genres of karaoke songs likewise the permanent moving pictures in the video CD. Therefore, the temporary picture may be selected based on the genre data read in step s13. Because the temporary picture is a still picture recorded in a JPEG format or a television picture being broadcast real-time, this temporary picture can be instantly displayed on the monitor 6 (step s17). Concurrently with this display, the karaoke performance is started. The performance requires processing such as setting the tone generator, taking several seconds of standby time. The temporary picture may be displayed after the standby time in synchronization with the karaoke performance. The temporary picture is kept displayed until notification comes from the video CD changer 4 that the permanent moving picture is ready for reproduction (step s18). When that notification comes, the display on the monitor 6 is switched to the video CD changer side, upon which the moving picture reproduced by the video CD changer is displayed on the monitor (step s19).

In the above-mentioned preferred embodiment, a plurality of still pictures are stored in correspondence to the karaoke song genres. From these still pictures, one item is selected based on the genre data written in the header of the song data. Alternatively, as shown in FIG. 5, a still picture table listing relationship between the still picture and the genre may be stored in the hard disk drive 17. Based on this table, a desired still picture may be selected. More than one still picture may be displayed as the temporary background image until the preparation of the video CD changer 4 is completed. A plurality of still pictures belonging to the same genre may be stored to provide a slide show in which these still pictures are displayed one after another.

Referring back to FIG. 1, in the inventive karaoke apparatus, an audio device is provided in the form of the tone generator 18 responsive to a request of a karaoke song or music piece for starting karaoke performance of the music piece to accompany a live singing voice of the music piece. A monitor device is provided in the form of the monitor 6 that displays a background image selected from a temporary picture having a short term and a permanent picture having a long term in matching with the music piece to support the karaoke performance. A first video device is provided in the form of the TV tuner 9 or else that is enabled initially without a substantial delay time when the audio device starts the karaoke performance for providing the temporary picture corresponding to the requested music piece. A second video device is provided in the form of the video CD changer 4 or else that is enabled subsequently to the first video device with a substantial delay time after the audio device starts the karaoke performance for providing the permanent picture corresponding to the requested music piece. A control device is provided in the form of the CPU 10 that operates when the karaoke performance is started upon the request for initially feeding the temporary picture provided from the first video device to the monitor device until the second video device is enabled, and that operates when the second video device is enabled for subsequently feeding the permanent picture provided from the second video device to the monitor device in place of the temporary picture so that the background image displayed on the monitor device is switched from the temporary picture to the permanent picture.

Specifically, the first video device reproduces a still picture from a fast video source such as a hard disk provided in the HDD 17 without the substantial delay time to provide the temporary picture in the form of the reproduced still picture, while the second video device reproduces a moving picture from a slow video source such as the video CD provided in the video CD changer 4 with the substantial delay time to provide the permanent picture in the form of the reproduced moving picture. Alternatively, the first video device is provided in the form of the TV tuner 9 for retrieving a television picture broadcasted from an external television source without the substantial delay time to provide the temporary picture in the form of the retrieved television picture, while the second video device reproduces a moving picture from an internal video source such as the video CD with the substantial delay time to provide the permanent picture in the form of the reproduced moving picture.

Preferably, the second video device utilizes a storage disk such as the video CD that stores the permanent picture which is provisionally compressed for storage, and a disk drive such as the video CD changer 4 that consumes the substantial delay time for preparatory operation necessary to start expansion of the compressed permanent picture stored in the storage disk in order to provide the permanent picture. The storage disk stores a plurality of permanent pictures, and the disk drive consumes the substantial delay time for search of the storage disk necessary to start reproduction of the permanent picture searched from the storage disk and corresponding to the requested music piece.

The invention covers the machine readable medium 25 for use in the karaoke apparatus having the CPU 10 and being responsive to a request of a music piece for starting karaoke performance of the music piece to accompany a live singing voice of the music piece while displaying on the monitor 6 a background image selected from a temporary picture having a short term and a permanent picture having a long term in matching with the music piece to support the karaoke performance. The machine readable medium 25 contains program instructions executable by the CPU 10 for causing the karaoke apparatus to perform the steps of initially providing the temporary picture corresponding to the requested music piece without a substantial delay time when the karaoke performance is started, subsequently providing the permanent picture corresponding to the requested music piece with a substantial delay time after the karaoke performance is started, feeding the provided temporary picture to the monitor 6 when the karaoke performance is started upon the request so that the background image can start concurrently with the karaoke performance, and further feeding the provided permanent picture to the monitor in place of the temporary picture so that the background image displayed on the monitor 6 is switched from the temporary picture to the permanent picture.

Specifically, the step of initially providing reproduces a still picture from a fast video source without the substantial delay time to provide the temporary picture in the form of the reproduced still picture, while the step of subsequently providing reproduces a moving picture from a slow video source with the substantial delay time to provide the permanent picture in the form of the reproduced moving picture. Alternatively, the step of initially providing retrieves a television picture broadcasted from an external television source without the substantial delay time to provide the temporary picture in the form of the retrieved television picture, while the step of subsequently providing reproduces a moving picture from an internal video source with the substantial delay time to provide the permanent picture in the form of the reproduced moving picture.

The step of subsequently providing comprises provisionally storing in a storage disk the permanent picture which is compressed for storage, and operating a disk drive that consumes the substantial delay time for preparatory operation necessary to start expansion of the compressed permanent picture stored in the storage disk in order to provide the permanent picture. Further, the step of subsequently providing comprises provisionally storing a plurality of permanent pictures in a storage disk, and operating a disk drive that consumes the substantial delay time for search of the storage disk necessary to start reproduction of the permanent picture searched from the storage disk and corresponding to the requested music piece.

As described and according to the invention, it takes time before starting the reproduction of a specified background image in case that moving pictures are stored in a compressed form for storing as many videos as possible or the background images are stored in a plurality of storage media. In such a case, karaoke performance can be started before the reproduction is started while a temporary image matching a karaoke song currently performed can be displayed, resulting in the karaoke performance free from awkwardness in performing a karaoke song which would be felt by a karaoke singer on the conventional karaoke apparatus.

While the preferred embodiment of the present invention has been described using specific terms, such description is for illustrative purposes only, and it is to be understood that changes and variations may be made without departing from the spirit or scope of the appended claims.

What is claimed is:

1. A karaoke apparatus comprising:

performing means responsive to a request of a karaoke song for carrying out a performance of the karaoke song to accompany a live singing voice;

monitor means for displaying a background image selected from a temporary picture and a moving picture to support the performance of the karaoke song;

storage means for storing the moving picture in a first media, the moving picture being provisionally compressed for storage;

reproducing means operable after preparation for starting expansion of the compressed moving picture stored in the storage means to reproduce the moving picture;

providing means operable instantly for providing the temporary picture from a second media which is different from and faster than the first media; and switching means operative when the performance of the karaoke song starts upon the request for accessing the providing means to feed the temporary picture to the monitor means until the reproducing means completes the preparation for reproduction of the moving picture, and being operative when the reproducing means starts the reproduction for switching the background image displayed on the monitor means from the temporary picture to the moving picture.

2. A karaoke apparatus comprising:

performing means responsive to a request of a karaoke song for carrying out a performance of the karaoke song to accompany a live singing voice;

monitor means for displaying a background image selected from a temporary picture and a moving picture to support the performance of the karaoke song;

storage means for storing a plurality of moving pictures in a first media;

reproducing means operable after search of the storage means for starting reproduction of the moving picture searched from the storage means and corresponding to the requested karaoke song;

providing means operable instantly for providing a temporary picture from a second media which is different from and faster than the first media; and switching means operative when the performance of the karaoke song starts upon the request for accessing the providing means to feed the temporary picture to the monitor means until the reproducing means completes the search of the storage means for the moving picture, and being operative when the reproducing means starts the reproduction of the moving picture for switching the background image displayed on the monitor means from the temporary picture to the moving picture.

3. A karaoke apparatus comprising:

an audio device responsive to a request for a music piece for starting a karaoke performance of the music piece to accompany a live singing voice of the music piece;

a monitor device that displays a background image selected from a temporary picture having a short term and a permanent picture having a long term in matching with the music piece to support the karaoke performance;

a first video device that is enabled initially without a substantial delay time when the audio device starts the karaoke performance for providing the temporary picture corresponding to the requested music piece from a first media;

a second video device that is enabled subsequently to the first video device with a substantial delay time after the audio device starts the karaoke performance for providing the permanent picture corresponding to the requested music piece from a second media which is different from and slower than the first media; and a control device that operates when the karaoke performance is started upon the request for initially feeding the temporary picture provided from the first video device to the monitor device until the second video device is enabled, and that operates when the second video device is enabled for subsequently feeding the permanent picture provided from the second video device to the monitor device in place of the temporary picture so that the background image displayed on the monitor device is switched from the temporary picture to the permanent picture.

4. The karaoke apparatus according to claim 3, wherein the first video device reproduces a still picture from a fast video source without the substantial delay time to provide the temporary picture in the form of the reproduced still picture, while the second video device reproduces a moving picture from a slow video source with the substantial delay time to provide the permanent picture in the form of the reproduced moving picture.

5. The karaoke apparatus according to claim 3, wherein the first video device retrieves a television picture broadcasted from an external television source without the substantial delay time to provide the temporary picture in the form of the retrieved television picture, while the second video device reproduces a moving picture from an internal video source with the substantial delay time to provide the permanent picture in the form of the reproduced moving picture.

6. The karaoke apparatus according to claim 3, wherein the second video device comprises a storage disk that stores the permanent picture which is provisionally compressed for storage, and a disk drive that consumes the substantial delay time for preparatory operation necessary to start expansion of the compressed permanent picture stored in the storage disk in order to provide the permanent picture.

7. The karaoke apparatus according to claim 3, wherein the second video device comprises a storage disk that stores a plurality of permanent pictures, and a disk drive that consumes the substantial delay time for search of the storage disk necessary to start reproduction of the permanent picture searched from the storage disk and corresponding to the requested music piece.

8. A karaoke method responsive to a request of a music piece for starting a karaoke performance of the music piece to accompany a live singing voice of the music piece, while displaying on a monitor a background image selected from a temporary picture having a short term and a permanent picture having a long term in matching with the music piece to support the karaoke performance, the karaoke method comprising the steps of:

initially providing the temporary picture from a first media corresponding to the requested music piece without a substantial delay time when the karaoke performance is started;

subsequently providing the permanent picture from a second media corresponding to the requested music piece with a substantial delay time after the karaoke performance is started;

feeding the provided temporary picture to the monitor when the karaoke performance is started upon the request so that the background image can start concurrently with the karaoke performance; and further feeding the provided permanent picture to the monitor in place of the temporary picture so that the background image displayed on the monitor is switched from the temporary picture to the permanent picture.

9. The karaoke method according to claim 8, wherein the step of initially providing reproduces a still picture from a fast video source without the substantial delay time to provide the temporary picture in the form of the reproduced still picture, while the step of subsequently providing reproduces a moving picture from a slow video source with the substantial delay time to provide the permanent picture in the form of the reproduced moving picture.

10. The karaoke method according to claim 8, wherein the step of initially providing retrieves a television picture broadcasted from an external television source without the substantial delay time to provide the temporary picture in the form of the retrieved television picture, while the step of subsequently providing reproduces a moving picture from an internal video source with the substantial delay time to provide the permanent picture in the form of the reproduced moving picture.

11. The karaoke method according to claim 8, wherein the step of subsequently providing comprises provisionally storing in a storage disk the permanent picture which is compressed for storage, and operating a disk drive that consumes the substantial delay time for preparatory operation necessary to start expansion of the compressed permanent picture stored in the storage disk in order to provide the permanent picture.

12. The karaoke method according to claim 8, wherein the step of subsequently providing comprises provisionally storing a plurality of permanent pictures in a storage disk, and operating a disk drive that consumes the substantial delay time for search of the storage disk necessary to start reproduction of the permanent picture searched from the storage disk and corresponding to the requested music piece.

13. A machine readable medium for use in a karaoke apparatus having a CPU and being responsive to a request of a music piece for starting a karaoke performance of the music piece to accompany a live singing voice of the music piece while displaying on a monitor a background image selected from a temporary picture having a short term and a permanent picture having a long term in matching with the music piece to support the karaoke performance, the medium containing program instructions executable by the CPU for causing the karaoke apparatus to perform the steps of:

initially providing the temporary picture from a first media corresponding to the requested music piece without a substantial delay time when the karaoke performance is started;

subsequently providing the permanent picture from a second media corresponding to the requested music piece with a substantial delay time after the karaoke performance is started;

feeding the provided temporary picture to the monitor when the karaoke performance is started upon the request so that the background image can start concurrently with the karaoke performance; and further feeding the provided permanent picture so that the background image displayed on the monitor is switched from the temporary picture to the permanent picture.

14. The machine readable medium according to claim 13, wherein the step of initially providing reproduces a still picture from a fast video source without the substantial delay time to provide the temporary picture in the form of the reproduced still picture, while the step of subsequently providing reproduces a moving picture from a slow video source with the substantial delay time to provide the permanent picture in the form of the reproduced moving picture.

15. The machine readable medium according to claim 13, wherein the step of initially providing retrieves a television picture broadcasted from an external television source without the substantial delay time to provide the temporary picture in the form of the retrieved television picture, while the step of subsequently providing reproduces a moving picture from an internal video source with the substantial delay time to provide the permanent picture in the form of the reproduced moving picture.

16. The machine readable medium according to claim 13, wherein the step of subsequently providing comprises provisionally storing in a storage disk the permanent picture which is compressed for storage, and operating a disk drive that consumes the substantial delay time for preparatory operation necessary to start expansion of the compressed permanent picture stored in the storage disk in order to provide the permanent picture.

17. The machine readable medium according to claim 13, wherein the step of subsequently providing comprises provisionally storing a plurality of permanent pictures in a storage disk, and operating a disk drive that consumes the substantial delay time for search of the storage disk necessary to start reproduction of the permanent picture searched from the storage disk and corresponding to the requested music piece.

* * * * *